United States Patent Office 2,715,120
Patented Aug. 9, 1955

---

2,715,120

MONOAZO-DYESTUFFS

Rudolf Ruegg, Basel, Arthur Buehler, Rheinfelden, and Eduard Moser, Basel, Switzerland, assignors to Ciba Limited, Basel, Switzerland, a Swiss firm No Drawing. Application July 17, 1951,
Serial No. 237,301

Claims priority, application Switzerland July 20, 1950

13 Claims. (Cl. 260—162)

According to this invention valuable new monoazo-dyestuffs are made by coupling a 1-alkyl-3-methyl-5-pyrazolone, which contains at least 4 carbon atoms in the alkyl radical, with a diazo compound of the benzene or naphthalene series.

The pyrazolones used as starting materials, which correspond to the formula

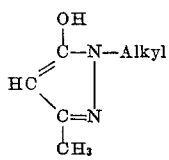

in which the alkyl radical contains at least 4 carbon atoms, can be made by reacting an appropriate monoalkyl-hydrazine with acetoacetic acid amide or an acetoacetic acid ester, for example, the methyl or ethyl ester. The monoalkyl-hydrazines of the constitution

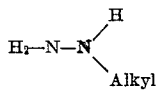

can be made by reacting hydrazine with an alkyl halide, for example, an alkyl bromide or alkyl chloride, which contains at least 4 carbon atoms in the alkyl radical.

The alkyl radical which is present in the alkyl halide or alkyl hydrazine or 1-alkyl-pyrazoline, may have a straight or branched chain. In view of their more ready accessibility there are of special interest those alkyl compounds which contain an even number of carbon atoms. The alkyl radical in the compounds referred to above may, for example, be an n-butyl, isobutyl, 2-ethyl-hexyl, n-amyl, n-hexyl, n-octyl, n-decyl, n-dodecyl, cetyl or octadecyl radical.

The monoalkyl-hydrazines are advantageously made by converting hydrazine sulfate in ethyl alcohol into hydrazine hydrate by means of an alkali hydroxide, and heating a considerable excess of the hydrazine hydrate so dissolved with an alkyl halide for a prolonged period. Since the monoalkyl-hydrazine sulfate obtained by adding sulfuric acid is considerably more easily soluble in alcohol than the excess of unreacted hydrazine sulfate, separation can be easily carried out, and there is no difficulty in isolating from the reaction mixture a monoalkyl-hydrazine sulfate sufficiently pure for further working up.

This can be carried out by a method in itself known, for example, by one of the usual methods for preparing 1-aryl-3-methyl-5-pyrazolones, namely by condensation with acetoacetic acid amide or acetoacetic acid ethyl ester by means of an acid-binding agent to form a 1-alkyl-3-methyl-5-pyrazoline, in the first case advantageously with the addition of acetic acid and an alkali acetate and, in the second, with the addition of an alkali hydroxide.

The new pyrazolones are powders soluble in alcohol.

Coupling of the pyrazolones with the diazo compounds in accordance with the present invention may be carried out, for example, in a weakly acid to weakly alkaline medium.

The diazo compounds of the benzene or naphthalene series which are coupled with the pyrazolones of the above constitution may be free from groups imparting solubility in water as, for example, in the case of diazo compounds obtainable from aminobenzene, 2:5-dichloro-1-aminobenzene, 2-nitro-4-methyl-1-aminobenzene or 2:4-dimethyl-1-aminobenzene. In this case there are obtained dyestuffs which are especially suitable for dyeing hydrophobic substances soluble in hydrocarbons, for example, fats, waxes, oils, resins and compositions made from such substances. The dyestuffs of this kind, especially those obtained from pyrazolones containing 4 to 8 carbon atoms in the alkyl radical, can also be used for dyeing cellulose acetate artificial silk or synthetic fibers of superpolyamides or superpolyurethanes, the dyeing being advantageously carried out in known manner from a fine dispersion.

When there are used as starting materials diazo compounds, which contain groups imparting solubility in water, for example, carboxylic acid groups or especially sulfonic acid groups, there are obtained especially valuable dyestuffs which are excellently suited for dyeing fibers of superpolyamides and materials of animal origin such, for example, as leather, silk and especially wool. As examples of suitable diazo compounds in this connection there may be mentioned the diazo compounds of the following amines:

1-aminobenzene-2- or -3- or -4-sulfonic acid, 1-aminobenzene-2:5-disulfonic acid, 2-amino-4'-tertiaryamyl-1:1'-diphenyl ether-4-sulfonic acid, 1-amino-naphthalene-4- or -5-sulfonic acid, 1-aminonaphthalene-3:6- disulfonic acid and 2-aminonaphthalene-4:8-disulfonic acid.

In an advantageous form of the process there are used diazo compounds which contain in a position vicinal to the diazotized amino group a substituent which is capable, together with the enolizable keto group of the pyrazolone, of forming complex metal compounds. As substituents of this kind there may be mentioned, for example, carboxylic acid groups, alkoxy groups (especially a methoxy group) and advantageously hydroxyl groups.

The thus obtained metallizable dyestuffs, which contain a sulfonic acid amide or a methyl sulfone group as the sole group imparting solubility in water and which can be obtained, for example, from 2-amino-1-hydroxybenzene-5-sulfonic acid-N-methylamide, 2-amino-1-hydroxybenzene-4- or -5-sulfonic acid amide, 6-chloro- or 6-nitro-2-amino-1-hydroxybenzene-4-sulfonic acid amide or from 2-amino-1-hydroxybenzene-4-methylsulfone and the pyrazolone above mentioned, are valuable dyestuffs, which can be used for dyeing wool according to the usual after-chroming or single bath chroming process.

If the diazo compounds used in the present process contain, in addition to the substituent vicinal to the diazotized amino group and capable of forming complexes, as a further substituent a sulfonic acid group, there are obtained dyestuffs which are especially well suited for dyeing wool by the usual after-chroming process and in some cases also by the single bath chroming process.

As examples of diazo components containing sulfonic acid groups there may be mentioned: 4-chloro-2-amino-1-hydroxybenzene-6-sulfonic acid, 4-nitro-2-amino-1-hydroxybenzene-6-sulfonic acid, 6-nitro-2-amino-1-hydroxybenzene-4-sulfonic acid, 4-methyl-2-amino-1-hydroxybenzene-5- or -6-sulfonic acid, 2-amino-1-hydroxybenzene-4-sulfonic acid, 2-amino-1-hydroxybenzene-4:6-disulfonic acid, 6-chloro-2-amino-1-hydroxybenzene-4-sulfonic acid, 2-amino-1-hydroxybenzene-6-carboxylic acid-4-sulfonic acid, 1-amino-2-hydroxynaphthalene-4-sulfonic acid, 2-amino-1-hydroxynaphthalene-4-sulfonic acid, 6-methoxy-1-amino-2-hydroxynaphthalene-4-sulfonic acid, 1-aminobenzene-2-carboxylic acid-4- or -5-sulfonic acid and 6 - nitro - 1 - amino - 2 - hydroxynaphthalene - 4 - sulfonic acid.

Valuable chromiferous dyestuffs are obtained from the above mentioned diazo components and especially those 1-alkyl-3-methyl-5-pyrazolones which contain an alkyl radical having 4–12, and preferably about 8, carbon atoms, for example, 1-n-octyl-3-methyl-5-pyrazolone. The dyeings obtainable with such dyestuffs by the after-chroming process or, if desired, the single bath chroming process are usually distinguished by the purity of their tints and good properties of wet fastness and fastness to light, and especially by their good fastness to washing and fulling.

From the foregoing statements it will be understood that the new monoazo-dyestuffs obtainable by the present process correspond to the formula

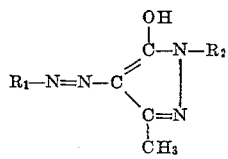

in which $R_1$ represents an aromatic radical of the benzene or naphthalene series, and $R_2$ represents an alkyl radical containing at least 4 carbon atoms.

The following examples illustrate the invention, the parts and percentages being by weight:

*Example 1*

31.8 parts of 1-n-dodecyl-3-methyl-5-pyrazolone are pasted with 3 parts of ethyl alcohol and then suspended in 100 parts of water and dissolved at 5° C. with 14 parts of sodium hydroxide solution of 30 per cent strength. 220 parts of sodium carbonate solution of 10 per cent strength are added to the slightly yellow solution of the sodium salt formed, and then a diazo solution prepared in the usual manner from 17.3 parts of 1-aminobenzene-4-sulfonic acid are introduced dropwise at 0° C. while stirring in the course of 30 minutes. The dyestuff which forms immediately is separated by filtration after a few hours, and is washed with sodium chloride solution of 10 per cent strength and dried.

It is a yellow powder which dissolves in water with a yellow coloration and dyes wool from an acetic acid bath yellow tints having good properties of fastness.

By using, instead of 17.3 parts of 1-aminobenzene-4-sulfonic acid, 30.3 parts of 2-aminonaphthalene-4:8-disulfonic acid there is obtained a dyestuff yielding reddish yellow dyeings and having similar properties.

There is obtained in the manner described in this example from 26.6 parts of 1-n-dodecyl-3-methyl-5-pyrazoline and 25.3 parts of 1-aminobenzene-2:5-disulfonic acid a yellow dyestuff of the formula

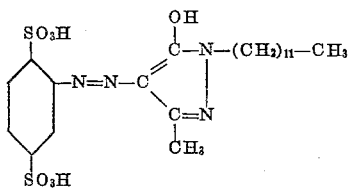

which dissolves in water with a yellow coloration and dyes wool yellow tints which are very fast to light.

The 1-n-dodecyl-3-methyl-5-pyrazolone used in this example may be prepared as follows:

In 1500 parts of ethyl alcohol there are introduced in portions and alternately 1300 parts of hydrazine sulfate and 800 parts of sodium hydroxide, while stirring and cooling, in such manner that the resulting magma remains stirrable. The mixture is stirred for about 12 hours longer at room temperature, the precipitated sodium sulfate is separated by filtering with suction, and the residue is washed 4 times with 100 parts of alcohol.

Into the resulting solution of hydrazine in alcohol there are introduced 409 parts of lauryl chloride (commercial n-dodecyl chloride) and the whole is boiled for 48 hours under reflux. The whole is allowed to cool, and 1000 parts of sulfuric acid of 98 per cent strength are added at 10–20° C. while stirring well and cooling externally. The whole is stirred for a further hour, the precipitated mixture of hydrazine sulfate and n-dodecyl-hydrazine sulfate is separated by filtering with suction, and washed with cold alcohol. The mixture is extracted at the boil with about 2000 parts of alcohol, and filtered while hot. The filter residue consists of hydrazine sulfate which can be reused. Upon cooling, acid n-dodecyl-hydrazine sulfate crystallizes from the filtrate. Further quantities of n-dodecyl-hydrazine sulfate can be obtained, if desired after filtering to remove the n-dodecyl sulfate which has already crystallized out, by evaporation in vacuo at 30–35° C.

59.1 parts of n-dodecyl-hydrazine sulfate are stirred in 480 parts of water at 30–40° C. and 55 parts of crystalline sodium acetate and 5 parts of glacial acetic acid are added. 20.2 parts of acetoacetic acid amide (obtainable as described in Example 7 of U. S. specification No. 2,152,132) are added and the whole is stirred for a few hours longer at room temperature. The pyrazolone formed precipitates out slowly. It is separated by filtration, washed with water, and dried in vacuo at 50° C. It is a pale brownish powder. When re-crystallized from alcohol, the resulting 1-n-dodecyl-3-methyl-5-pyrazolone melts at 75–76° C.

By using 37.2 parts of n-butyl-hydrazine sulfate, which can be obtained by the method described in the preceding paragraph from n-butyl chloride or bromide, there is obtained 1-n-butyl-3-methyl-5-pyrazolone. It is a brownish powder which is insoluble in water and is easily soluble in alcohol and benzene, and melts at about 56° C.

By using 54 parts of n-decyl-hydrazine sulfate there is obtained 1-n-decyl-3-methyl-5-pyrazolone. When recrystallized from alcohol it melts at 65–66° C.

By using 48.4 parts of n-octyl-hydrazine sulfate there is obtained 1-n-octyl-3-methyl-5-pyrazolone which melts at 59–60° C. after recrystallization from alcohol.

*Example 2*

23.4 parts of 4-nitro-2-amino-1-hydroxybenzene-6-sulfonic acid are suspended in 200 parts of water with the addition of 15 parts of hydrochloric acid of 30 per cent strength, and diazotized at 2–5° C. with a solution of 6.9 parts of sodium nitrite in 25 parts of water. The clear diazo-solution is neutralized with a dilute solution of sodium carbonate and then coupled with a cooled solution obtained by dissolving 15.4 parts of 1-n-butyl-3-methyl-5-pyrazolone, 4 parts of sodium hydroxide and 5.3 parts of anhydrous sodium carbonate in 250 parts of water. When the coupling is complete the precipitated dyestuff is separated by filtration, washed with dilute sodium chloride solution and dried. It is a red powder which dissolves in water and in dilute sodium hydroxide solution with a red orange coloration and in concentrated sulfuric acid with a green yellow coloration. The dystuff dyes wool from acid baths yellowish red tints which, when after-chromed, change to orange tints having good properties of fastness to light and fulling.

A number of further monoazo-dyestuffs are given in the following table. They can be obtained by the method described in this example by coupling the diazo compound of the amine mentioned in column I with the pyrazolone mentioned in column II. The properties of the dyestuffs are given in columns III and IV. All these dystuffs are also distinguished by yielding on wool after-chomed dyeings having very good properties of fastness to light and fulling. The dyestuffs Nos. 1 and 3 to 9 are also very well suited for dyeing by the single bath chroming process.

| I. Diazo-component | II. Azo-component | III. Color of solution in— | | | IV. Dyeing on wool | |
|---|---|---|---|---|---|---|
| | | Water | Dilute NaOH | Concentrated $H_2SO_4$ | from an acetic acid bath | after-chromed |
| (1) 4-chloro-2-amino-1-hydroxy-benzene-6-sulfonic acid. | 1-n-butyl-3-methyl-5-pyrazolone. | red | yellow | red orange | orange | yellowish red. |
| (2) 2-aminobenzene-1-carboxylic-acid-4-sulfonic acid. | 1-n-octyl-3-methyl-5-pyrazolone. | greenish yellow | greenish yellow | greenish yellow | yellow | brownish yellow. |
| (3) 1-amino-2-hydroxynaphthalene-4-sulfonic acid. | do | red | orange | violet | orange | red. |
| (4) 4-nitro-2-amino-1-hydroxy-benzene-6-sulfonic acid. | do | orange | do | greenish yellow | pure red | brownish orange. |
| (5) 4-chloro-2-amino-1-hydroxy-benzene-6-sulfonic acid. | do | red orange | yellow | orange | orange | yellowish red. |
| (6) 4-chloro-2-amino-1-hydroxy-benzene-6-sulfonic acid. | 1-n-dodecyl-3-methyl-5-pyrazolone. | do | do | do | do | Do. |
| (7) 2-amino-1-hydroxybenzene-4-sulfonic acid amide. | 1-n-octyl-3-methyl-5-pyrazolone. | orange | do | greenish yellow | yellow | orange. |
| (8) 6-nitro-2-amino-1-hydroxy-benzene-4-sulfonic acid amide. | do | do | | do | orange | Do. |
| (9) 2-amino-1-hydroxybenzene-4-methyl-sulfone. | do | do | green-yellow | yellow | do | Do. |

The formulae of representative dyestuffs of the foregoing table are:

No. 3
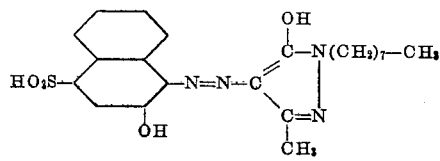

No. 4
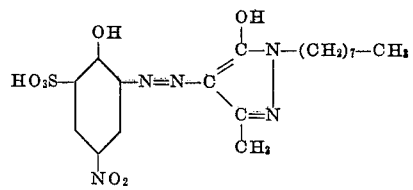

No. 5
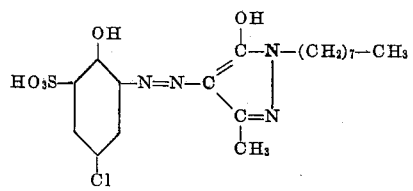

The 1-n-octyl-3-methyl-5-pyrazolone used can also be obtained, for example, by the following method:

48.4 parts of n-octyl-hydrazine sulfate (which can be obtained from n-octyl chloride by the method described in Example 1 for making n-dodecyl-hydrazine sulfate) are stirred in 220 parts of water, and 26 parts of acetoacetic acid ethyl ester are poured in while stirring at room temperature. The sulfuric acid liberated is neutralized in the course of 3 hours after the addition of a total of 48 parts of sodium hydroxide solution of 30 per cent. strength. The hydrazone precipitates in the form of a yellow oil. 40 parts of an aqueous solution of sodium hydroxide of 30 per cent strength are poured into the suspension and the whole is heated for 1 hour at 70° C. The clear solution is allowed to cool to room temperature, and the 1-n-octyl-3-methyl-5-pyrazolone is precipitated by acidification with 40 parts of hydrochloric acid of 30 per cent. strength. The pyrazolone precipitates at first in an oily form and becomes solid during the further stirring in the cold. The pyrazolone is separated by filtration and dried in vacuo at 45° C.

*Example 3*

18.8 parts of 2-amino-1-hydroxybenzene-5-sulfonic acid amide are dissolved in 400 parts of water with the addition of 4 parts of sodium hydroxide. After the addition of 34 parts of hydrochloric acid of 30 per cent. strength a solution of 6.9 parts of sodium nitrite in 25 parts of water is run in at a temperature of 0–5° C. When the diazotization is finished, the diazo compound, which is partially precipitated in a crystalline form is neutralized by the addition of sodium carbonate and added to a cooled solution obtained from 15.4 parts of 1-n-butyl-3-methyl-5-pyrazolone, 4 parts of sodium hydroxide, 13.6 parts of crystalline sodium acetate and 250 parts of water. When the coupling is finished, the dystuff formed is precipitated by the addition of sodium chloride and separated by filtration. When dry it is a brown powder which dissolves in water and in concentrated sulfuric acid with an orange coloration and dyes wool from an acid bath yellow tints which can be converted by after-chroming into reddish orange tints of good fastness to fulling and light. The dyestuff is also suitable for dyeing by the single bath chroming process.

A dyestuff having similar properties is obtained by using in this example instead of 2-amino-1-hydroxybenzene-5-sulfonic acid amide, 20.2 parts of 2-amino-1-hydroxybenzene-5-sulfonic acid - N - methylamide, and proceeding otherwise in the same manner.

*Example 4*

A diazonium solution prepared in the usual manner from 15.2 parts of 2-nitro-4-methyl-1-aminobenzene is introduced dropwise at 0° C. into a solution of 15.4 parts of 1-n-butyl-3-methyl-5-pyrazolone in an excess of a dilute solution of sodium hydroxide. The yellow dyestuff which precipitates immediately is separated by filtration after a few hours, and pasted with sulfite cellulose waste liquor and dried in vacuo at 50° C. The pasted dyestuff is obtained in the form of a yellow incrustation, which after being pasted with water dyes cellulose acetate artificial silk and polyamide fibers (nylon) from neutral baths in very good yield yellow tints which are fast to washing.

*Example 5*

100 parts of well wetted wool are entered at 40–50° C. into a dyebath which contains in 4000 parts of water 1 part of the dyestuff obtainable as described in the first paragraph of Example 1 and 10 parts of crystalline sodium sulfate. 3 parts of acetic acid of 40 per cent. strength are added, and the bath is raised to the boil in the course of ½ hour and dyeing is carried on for ¾ hour at the boil. Finally, the wool is rinsed with cold water and dried. There is obtained a yellow dyeing of good fastness to light.

*Example 6*

100 parts of well wetted wool are entered at 60° C. into a dyebath which contains in 4000 parts of water 1 part of the dyestuff No. 5 of the table in Example 2, 4 parts of acetic acid of 40 per cent. strength and 10 parts of crystalline sodium sulfate. The temperature is raised to the boil in the course of 30 minutes, and dyeing is carried on at the boil for 45 minutes. 5 parts of sulfuric acid of 10 per cent. strength are then added and dyeing is continued for a further 15 minutes. The dyebath is then cooled to about 70° C., 1.1 parts of potassium bichromate are added, and the bath is raised to the boil, and chroming is carried on for about 40 minutes at the boil. The wool is dyed a yellowish red tint.

*Example 7*

A dyebath is prepared with 4000 parts of water, 1.5 parts of potassium chromate, 1.5 parts of ammonium sulfate, 10 parts of crystalline sodium sulfate and 1 part of the dyestuff No. 1 of the table in Example 2, 100 parts of well wetted wool are entered into the dyebath at 60° C., the temperature is raised to the boil in the course of 30 minutes, and boiling is continued for 45 minutes. There is then added 0.5 part of acetic acid of 40 per cent. strength and boiling is continued for a further 45 minutes. The wool is dyed a yellowish red tint.

*Example 8*

1 part of the dyestuff of Example 4 pasted with sulfite cellulose waste liquor is made up into a paste with about 50 parts of water at 30–40° C., and then added to the dyebath through a fine sieve. 100 parts of cellulose acetate artificial silk yarn are entered into the dyebath at 40–50° C., the temperature is slowly raised to 75–80° C., and the bath is exhausted at this temperature for 1 hour. The material is then finished in the usual manner and there is obtained a yellow dyeing which is very fast to washing.

What is claimed is:

1. A monoazo-dyestuff of the formula

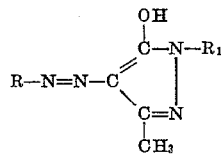

wherein $R_1$ represents an alkyl radical of at least 4 carbon atoms and R represents an aromatic radical containing at least one six-membered carbocyclic nucleus and at most two such nuclei condensed with one another.

2. A monoazo-dyestuff of the formula

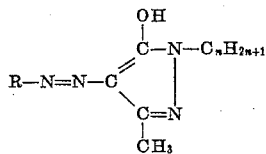

wherein $n$ represents an integer which is at least 4 and at most 8, and R represents a benzene radical which is free from groups imparting solubility in water.

3. A monoazo dyestuff of the formula

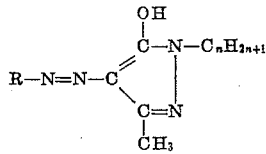

wherein $n$ represents an integer which is at least 4 and at most 12, and R represents an aromatic radical containing at least one sulfonic acid group, at least one six-membered carbocyclic nucleus and at most two such nuclei condensed with one another.

4. A monoazo-dyestuff of the formula

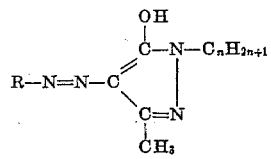

wherein $n$ represents an integer which is at least 4 and at most 12, and R represents a benzene radical containing at least one and at most two sulfonic acid groups.

5. A monoazo-dyestuff of the formula

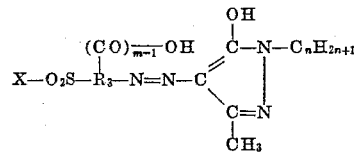

wherein $m$ represents an integer which is at most 2, $n$ represents an integer which is at least 4 and at most 12, X represents a member selected from the group consisting of an amino and a hydroxyl group, and $R_3$ represents an aromatic radical containing at least one six-membered carbocyclic nucleus and at most two such nuclei condensed with one another, which aromatic radical is bound to the azo group in a position vicinal to the $—(CO)_{m-1}OH$ group.

6. A monoazo-dyestuff of the formula

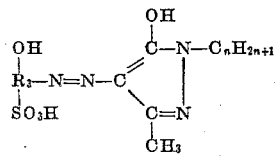

wherein $n$ is an integer which is at least 4 and at most 12 and $R_3$ represents a benzene radical which is bound to the azo group in a position vicinal to the hydroxyl group.

7. A monoazo-dyestuff of the formula

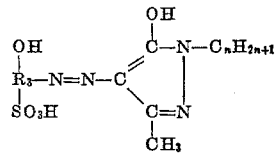

wherein $n$ is an integer which is at least 4 and at most 12 and $R_3$ represents a naphthalene radical bound to the hydroxyl group in one of the positions 1 and 2 and bound to the azo group in the other of these two positions.

8. A monoazo-dyestuff of the formula

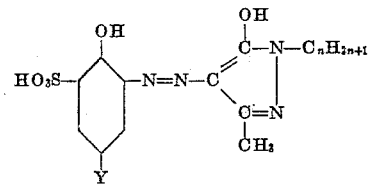

wherein Y represents a member selected from the group consisting of a chlorine atom and nitro group, and $n$ represents an integer which is at least 4 and at most 12.

9. A monoazo-dyestuff of the formula

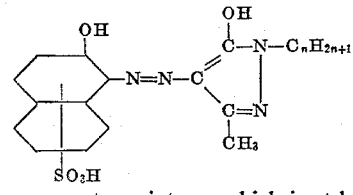

wherein $n$ represents an integer which is at least 4 and at most 12.

10. The monoazo-dyestuff of the formula

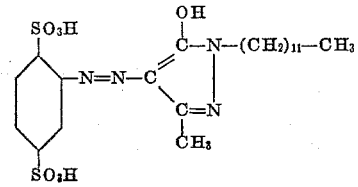

11. The monoazo-dyestuff of the formula
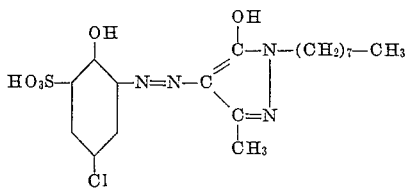
12. The monoazo-dyestuff of the formula
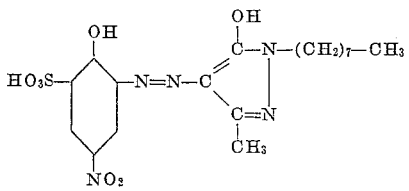
13. The monoazo-dyestuff of the formula
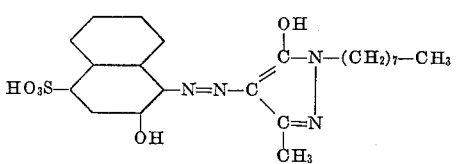
References Cited in the file of this patent
UNITED STATES PATENTS
| | | |
|---|---|---|
| 2,048,898 | Straub et al. | July 28, 1936 |
| 2,439,098 | Porter | June 15, 1945 |
| 2,472,581 | Gregory | June 7, 1949 |
FOREIGN PATENTS
| | | |
|---|---|---|
| 394,343 | Great Britain | June 12, 1933 |